(12) United States Patent
Luo et al.

(10) Patent No.: US 9,503,905 B2
(45) Date of Patent: Nov. 22, 2016

(54) SPECTRUM SHARING (75) Inventors: Jijun Luo, München (DE); Jaakko Eino Ilmari Vihriala, Oulu (FI)

(73) Assignee: Nokia Solutions and Networks Oy, Espoo (FI)

( * ) Notice: Subject to any disclaimer, the term of this patent is extended or adjusted under 35 U.S.C. 154(b) by 479 days.

(21) Appl. No.: 13/124,143

(22) PCT Filed: Oct. 17, 2008

(86) PCT No.: PCT/EP2008/064029
§ 371 (c)(1),
(2), (4) Date: Apr. 14, 2011

(87) PCT Pub. No.: WO2010/043270
PCT Pub. Date: Apr. 22, 2010

(65) Prior Publication Data
US 2011/0201372 A1 Aug. 18, 2011

(51) Int. Cl.
*H04B 17/00* (2015.01)
*H04W 16/14* (2009.01)
*H04W 72/08* (2009.01)

(52) U.S. Cl.
CPC ........... *H04W 16/14* (2013.01); *H04W 72/08* (2013.01)

(58) Field of Classification Search
CPC . H04W 24/10; H04W 52/243; H04W 28/16; H04W 16/14

USPC .......... 455/450, 451, 452.1, 452.2, 443, 444
See application file for complete search history.

(56) References Cited

U.S. PATENT DOCUMENTS

| | | | |
|---|---|---|---|
| 5,862,487 A | 1/1999 | Fujii et al. | 455/454 |
| 5,952,767 A | 9/1999 | Kuwabara et al. | 313/2.1 |
| 7,146,176 B2 * | 12/2006 | McHenry | 455/454 |
| 7,403,576 B2 * | 7/2008 | Lakkis | 375/316 |
| 2002/0002052 A1 * | 1/2002 | McHenry | 455/447 |
| 2003/0169697 A1 * | 9/2003 | Suzuki et al. | 370/310 |
| 2008/0130519 A1 | 6/2008 | Bahl et al. | 370/254 |
| 2009/0047971 A1 * | 2/2009 | Fu | H04W 72/082 455/450 |

FOREIGN PATENT DOCUMENTS

GB   2 422 968 A   8/2006

* cited by examiner

Primary Examiner — Tu X Nguyen
(74) Attorney, Agent, or Firm — Harrington & Smith (57) ABSTRACT The invention provides methods, a network device and radio station for spectrum resource allocation in a network employing spectrum sharing among at least a primary and secondary system, including scanning, by a network device of the secondary system, a specific frequency range of a candidate band of the primary system, estimating, by the network device, interference level on the scanned candidate band of the primary system, determining position of the network device, and transmitting the estimation result to a radio station of the secondary system.

11 Claims, 7 Drawing Sheets

SPECTRUM SHARING

The invention relates to a method and network device involved in spectrum sharing among primary and secondary users in mobile communication networks.

More particularly, the invention is directed to self-organization, i.e. automatic spectrum sharing, where communication between two (or more) networks is limited, or does not exist.

Spectrum sharing means that different radio access networks or different services use the same frequency band with or without coordination between the networks.

A problem in spectrum sharing is the white space detection, which means detection of unused frequency/time slot and that there is correlation between adjacent frequency/time slots in frequency, time and/or space. A typical situation is when the secondary system (which does not have license for the target band) attempts to use resources of the primary system (which has a license for the target band). Before the resource can be used, the secondary system needs to know the interference level on the candidate band. Otherwise, high interference problem will occur.

According to known solutions, like e.g. in WINNER (Wireless World Initiative New Radio) systems, it has been considered to use measurements to obtain enough information on the system, the spectrum of which is intended to be shared, which basically is the primary system. In such systems, only basic measurement methods have been proposed, as power, energy and feature detection using cyclostationary feature.

According to an aspect of the present invention there is provided a method for spectrum resource allocation in a network employing spectrum sharing among at least a primary and secondary system, comprising:
  scanning, by a network device of the secondary system, a specific frequency range of a candidate band of the primary system,
  estimating, by the network device, interference level on the scanned candidate band of the primary system,
  determining position of the network device,
  transmitting the estimation result to a radio station of the secondary system.

According to further refinements of the invention as defined under the above aspect,
  estimating is performed frequency selective;
  the method comprises:
    receiving from at least one network device an estimation of interference level on a scanned frequency range of a candidate band of a primary system and position information of the network device,
    evaluating, based on the at least one estimation of the interference level and the position of the at least one network device, interference level in an entire cell area,
    indicating the network device a suitable frequency for resource request according to the position of the network device,
    instructing network devices to scan complementary frequency bands if it is recognized that two or more network devices have similar position, combining estimation results of a plurality of network devices,
    instructing one of the network devices to stop scanning if it is recognized that two or more network devices have similar position,
    when the interference level at a particular position and frequency is lower than a predetermined value, indicating to the network device that spectrum resources of the particular frequency of the primary system can be used at the particular position.
  the above described method is implemented in a radio station such as a base station or node B.

According to a further aspect of the present invention, there is provided a network device, comprising:
  means for scanning a specific frequency range of a candidate band of the primary system,
  means for estimating interference level on the scanned candidate band of the primary system,
  means for determining position of the network device,
  means for transmitting the estimation result to a radio station of the secondary system.

According to further refinements of the invention as defined under the above aspect, the estimating means is adapted to perform the estimation frequency selective.

According to a further aspect of the present invention, there is provided a radio station, comprising:
  means for receiving from at least one network device an estimation of interference level on a scanned candidate band of a primary system and position information of the network device, and
  means for evaluating, based on the at least one estimation of the interference level and the position of the at least one network device, interference level in an entire cell area.

According to further refinements of the invention as defined under the above aspect,
  the radio station further comprises
    means for indicating the network device a suitable frequency for resource request according to the position of the network device,
  means for instructing network devices to scan complementary frequency bands if it is recognized that two or more network devices have similar position,
  means for combining estimation results of a plurality of network devices,
  means for instructing one of the network devices to stop scanning if it is recognized that two or more network devices have similar position,
    when the interference level at a particular position and frequency is lower than a predetermined value, means for indicating to the network device that spectrum resources of the particular frequency of the primary system can be used at the particular position.
  the radio station is a base station, node B or the like.

According to a further aspect of the present invention, there is provided a computer program product including a program for a processing device, comprising software code portions for performing the steps of the method as described above when the program is run on the processing device.

The invention enables reliable white spectrum detection and spectrum sharing with a high usage of spectrum. Further, according to the invention, there is higher throughput and spectral efficiency for both the primary and the secondary system and battery life of the network devices is improved. Further, there is flexibility in similar UE job assignments, that is, UEs with similar location information can either stop scanning or scan complimentary frequency ranges. The UEs can also scan the same frequency. These measurement results can then be combined to improve the reliability of the measurement.

For the purpose of the present invention to be described herein below, it should be noted that
  a network device may for example be any kind of communication device, such as wireless devices, e.g. personal computers, mobile phones or the like, irrespective of a specific standard to which these conform;

method steps likely to be implemented as (low level) software code portions and being run using a processor at one of the base station/network device entities, are software code independent and can be specified using any known or future developed programming language as long as the functionality defined by the method steps is preserved;

generally, any method step is suitable to be implemented as software or by hardware without changing the idea of the present invention in terms of the functionality implemented;

method steps and/or devices likely to be implemented as hardware components at one of the network elements or gateways are hardware independent and can be implemented using any known or future developed hardware technology or any hybrids of these, such as MOS (Metal Oxide Semiconductor), CMOS (Complementary MOS), BiCMOS (Bipolar CMOS), ECL (Emitter Coupled Logic), TTL (Transistor Transistor Logic), etc., using for example ASIC (Application Specific Integrated Circuit) components or DSP (Digital Signal Processor) components, as an example;

devices/means can be implemented as individual devices/means, but this does not exclude that they are implemented in a distributed fashion throughout the system, as long as the functionality of the device/system is preserved;

respective means, e.g. scanning means, estimating means, etc. according to present embodiments can be implemented by any known means, either in hardware (DSP, microprocessor, microcontroller, ASIC, FPGA, etc) and/or software, respectively, as long as it is adapted to perform the described functions of the respective parts;

an apparatus/device may be represented by a semiconductor chip, a chipset, or a (hardware) module comprising such chip or chipset; this, however, does not exclude the possibility that a functionality of an apparatus, device or module, instead of being hardware implemented, be implemented as software in a (software) module such as a computer program or a computer program product comprising executable software code portions for execution/being run on a processor;

a device may be regarded as an apparatus or as an assembly of more than one apparatus, whether functionally in cooperation with each other or functionally independently of each other but in a same device housing, for example.

Although the present invention is described herein with reference to particular embodiments thereof, the present invention is not limited thereto and various modifications can be made.

BRIEF DESCRIPTION OF THE DRAWINGS

Embodiments of the present invention are described herein below with reference to the accompanying drawings, wherein.

DETAILED DESCRIPTION OF PREFERRED EMBODIMENTS

Embodiments of the present invention will be described herein below with reference to the accompanying drawings.

Figure 1:
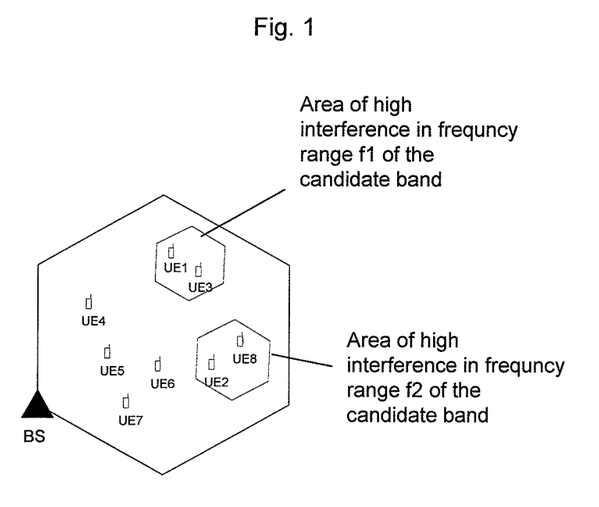
FIG. 1 shows part of a secondary network according to embodiments of the invention.

FIG. 1 shows a cell of a secondary network utilizing spectrum sharing according to an embodiment of the invention.

The secondary network comprises a base station BS and several network devices like e.g. user equipment UE1 to UE8. However, the secondary network may of course comprise any other suitable number of base stations and user equipments.

According to embodiments of the invention, the positions of user equipments are used in estimating interference levels (white spots) in the cell area. These spatially selective interference levels can then be used for spectrum sharing. According to the position dependent measurement information, the secondary system is able to use spectrum resources when the interference level at that particular position is low enough. According to the location dependent measurement, the network informs the terminals about the right frequency for resource requests. UEs in the same group that suffer similar interference characteristics can takeover complementary scanning jobs, which means that they can scan complementary frequencies.

As shown in FIG. 1, UE1 and UE3 are located relatively close to each other and are both located in an area in which high interference for a frequency f1 in the candidate band of a primary network (not shown in FIG. 1) is present. Similarly, UE2 and UE8 are located relatively close to each other and are both located in an area in which high interference for a frequency f2 in the candidate band of the primary network is present.

The BS is the secondary BS which does not have the licence to be operated in the candidate band of the primary system, but allowed to communicate with its UEs in the candidate band in case the transmission does not interfere the primary system. UE's in the cell measure the interference in the candidate band (on the candidate band, there is interference in the shaded area) and transmit the measurement results to the BS. Based on UE location estimates, the BS can then assess interference in the entire cell area. The shaded areas in FIG. 1 indicate different frequency values. For instance, frequency f1 which is part of the candidate band can not be used in the shaded area covering UE1 and UE3, but frequency f1 of candidate band can be used outside the shaded area. Similarly, frequency f2 can not be used in the shaded area covering UE2 and UE8, but frequency f2 of candidate band can be used outside the shaded area.

In estimation of the actual interference level, an instantaneous interference level as well as a long term average is used. If both measurements indicate that there is high interference, such a frequency should not be used in the particular area where the measurement was taken. For example, it is indicated in FIG. 1 that UE1 experiences interference in a frequency range f1 in current measurement and also the long time average interference on the candidate band is high. Hence, an allocation cannot be made. If it is known that UE1 and UE3 are in the same area, their interference estimates can be combined in order to obtain more accurate results.

On the other hand, it is shown in FIG. 1 that e.g. UE2 does not suffer from interference in the frequency range f1 (neither instantaneous nor long term) and thus the candidate band according to frequency f1 can be used by UE2. However, it may be possible that another frequency, e.g. f2 is not suitable to be used in this area, as depicted in FIG. 1. Hence, the BS has to perform spatial selective resource allocation.

In addition, nearby UEs experiencing the same interference characteristics can contribute to more reliable estimation. For example, since UE2 and UE8 are close to each other, their interference estimates can be combined to get a more reliable estimation information. In addition, for faster scanning knowledge acquisition, UE2 and UE8 can scan complimentary spectrum resources, e.g. UE2 scans a frequency range f3 and UE8 scans a frequency range f4.

Further, also the velocity of an UE can be estimated from the received signal. The estimate can then be used in adjusting the filtering parameters of a long term interference estimate.

Figure 2:
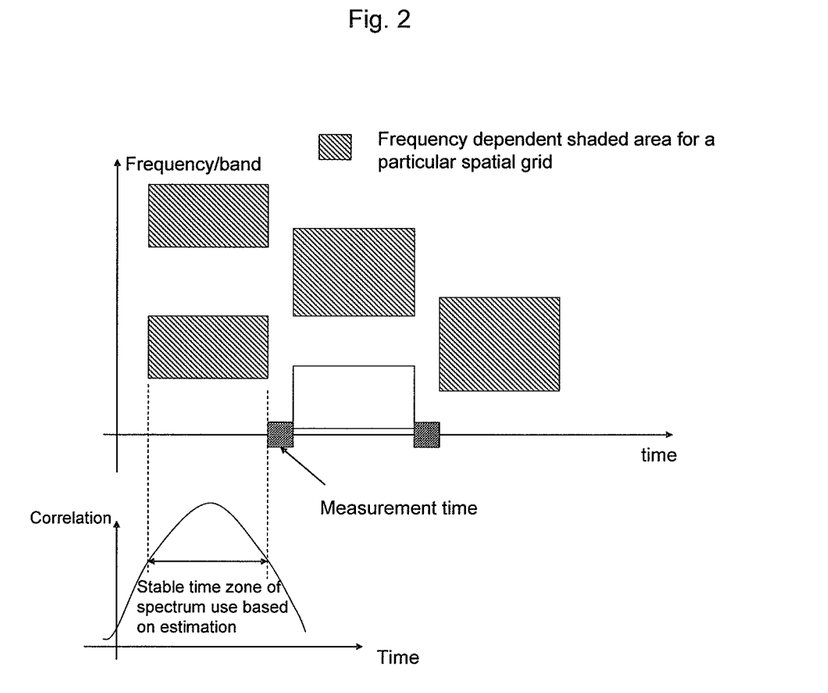
FIG. 2 shows an example of time variant spectrum use according to embodiments of the invention.

Due to the time varying feature of the interference source, the non proper frequency use in the shared area will look differently along with time. The network has to calculate the period during which the interference feature with respect to spectrum is rather constant. As depicted in FIG. 2, the secondary network can coordinate the terminal to reduce the measurement effort during the stable time period before next scanning phase. The stable time period can be derived according to 3 dB measurement after autocorrelation operation on the interference stochastic values.

When an UE moves to that geographical area, the network can indicate the suitable spectrum resources for use. An UE that has not performed any measurement in that area does not even measure the non-proper frequency. This mechanism can significantly save terminal's battery life.

Due to different frequency partitioning mechanism of neighboring BSs, the interference statistic behavior in different frequencies will look different. Therefore the stable period can be different for different frequencies. The measurement period of the terminal should also be adjusted accordingly.

Figure 3:
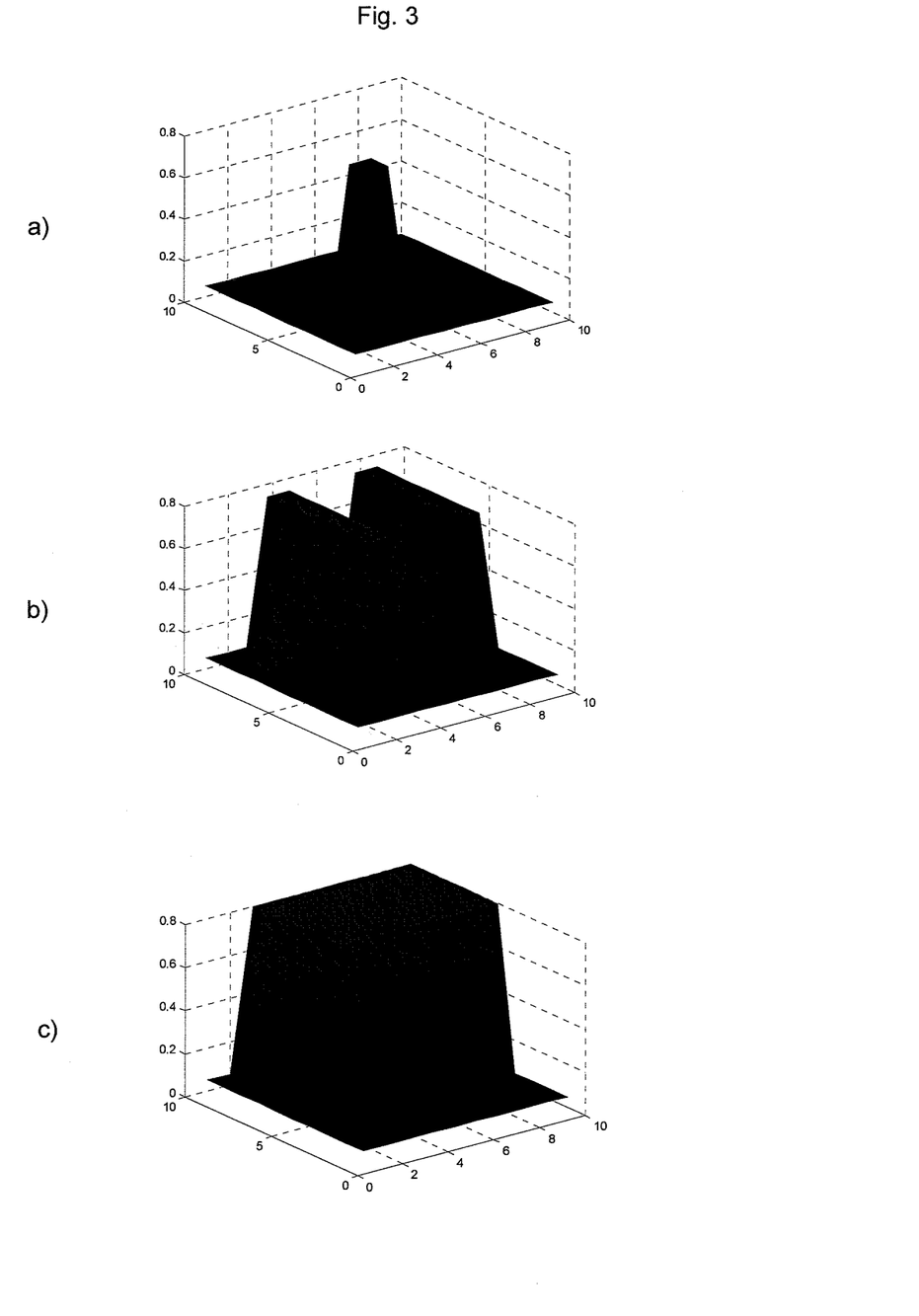
FIG. 3 shows a diagram illustrating how interferences in a cell change as a function of time in a simulation.

FIG. 3 describes probabilities for interference within a specific area in a simulation. In FIG. 3, x- and y-axis indicate spatial dimensions and z-axis indicates the probability of high interference. The probability of interference changes in time. There are three long time intervals. First is shown in FIG. 3a, in which the probability of high interference is 0.8 only in small area in the cell. In the second interval, the probability of high interference occurs in a larger geographical area (FIG. 3b) and in the third interval (FIG. 3c) the area of high interference is even larger.

The probability of interference exceeding the threshold at a particular frequency in the high interference areas is 0.8 and for other areas 0.05. It is assumed that one UE is located in each area and is able to measure and transmit interference estimate to the BS. Probability of measurement error is taken for example 0.15. Therefore, the interference is spatially and temporally selective.

This scenario has been used to illustrate that there are significant changes in the interference as a function of time and space. However, it is to be noted that FIG. 3 shows only probabilities. This means that high interference can occur anywhere in the cell.

Since according to the present invention, the location of the UE is taken into account, the invention can cope with such a situation. According to the prior art, the probability for interferences would have been indicated for the cell as a whole and not dependent on specific areas within the cell.

According to embodiments of the invention, three different spectrum assignment methods are used. A first one is based only on short term measurement, a second one only on long term measurement and a third one is a combination, i.e. a weighted sum of short and long term measurements.

Figure 4:
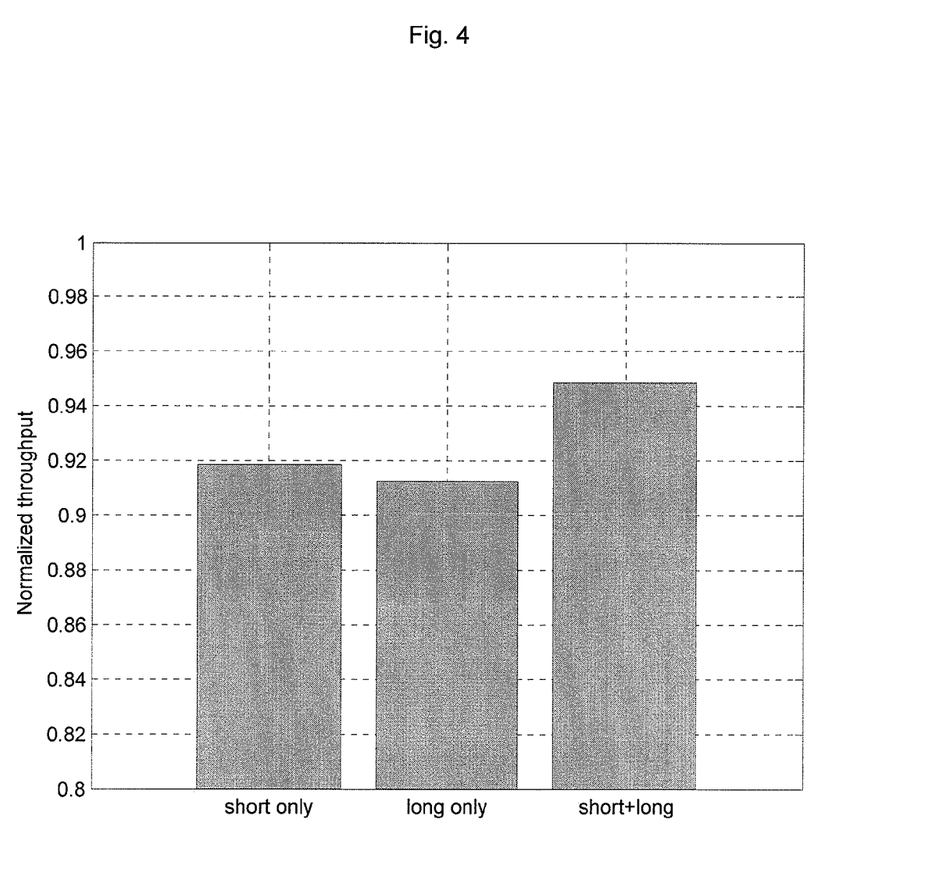
FIG. 4 shows simulation results of throughput according to embodiments of the invention.

Performance measure is a sum of the throughput of both secondary and primary system. If allocation is made on an area, where there is no interference, we get one unit of throughput for the secondary system and if allocation is not made where there is interference, we get one unit of throughput for the primary system. FIG. 4 illustrates simulation results where throughput is normalized so that a theoretical maximum is 1.

According to embodiments of the invention, white space detection is implemented in the UE and that the UE has means to transmit the measurement results to the BS.

Figure 5:
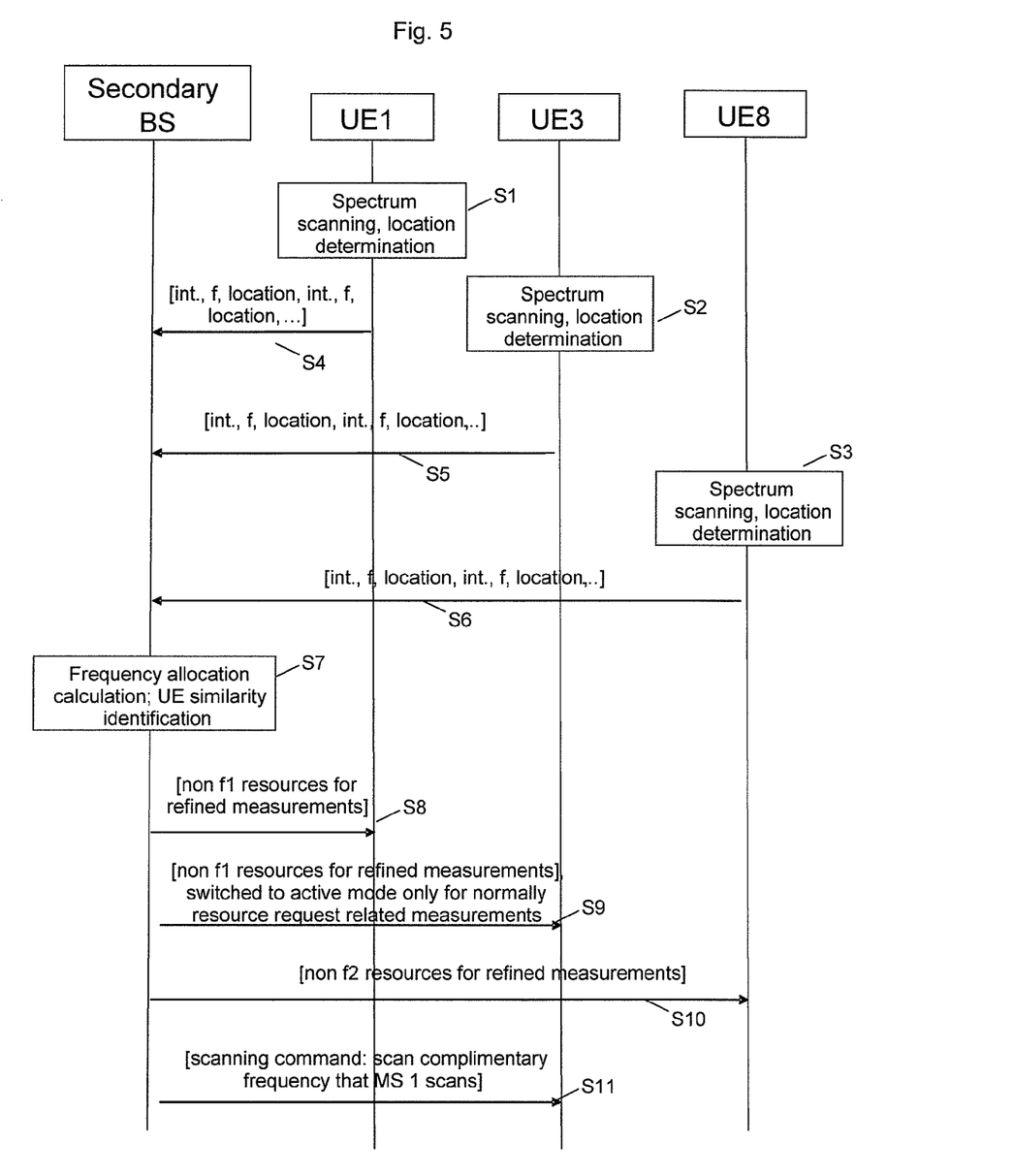
FIG. 5 shows signalling between a network device and a base station of a secondary network according to embodiments of the invention.

One message exchange example is given in FIG. 5. According to FIG. 5, three user equipments UE1 to UE3 and UE8 and a secondary base station BS are shown. The UEs perform spectrum scanning and location determination in steps S1 to S3 and send the respective data about the scanned frequency range, the location, and the interference to the base station BS in steps S4 to S6. In a step S7, the BS then performs frequency allocation calculation and UE similarity identification, which means to identify which UE have nearly the same location, i.e. are located close to each other, based on the received data of each UE.

As seen from FIG. 1, UE1 and UE3 are located in an area in which there is interference in the frequency range of f1 and UE8 is located in an area in which there is interference in the frequency range of f2. Thus, after detecting that UE1 and UE3 experience interference in the frequency range of f1, in steps S8 and S9, the base station instructs UE1 and UE3 to perform further refined measurements on frequency ranges other than f1.

Similarly, the base station detects from the received data that UE8 experiences interference in the frequency range of f2 and therefore, in a step S10, the base station instructs UE8 to perform further refined measurements on frequency ranges other than f2.

Further, in step S7, the base station identifies that UE1 and UE3 have similar location information, i.e. that UE1 and UE3 are located close to each other. Hence, in step S11, the base station can instruct UE3 to scan another frequency range than UE1 scans, i.e. a complementary frequency range. Thus, since UE1 and UE3 are located close to each other, it is assumed that their measurements are very similar and hence their measurements of different frequency ranges can be combined by the BS to achieve better results with fewer measurements.

However, the base station can also instruct UE3 to stop its measurements and to switch to an active mode only for normally resource related measurements, as indicated in step S9.

Figure 6:
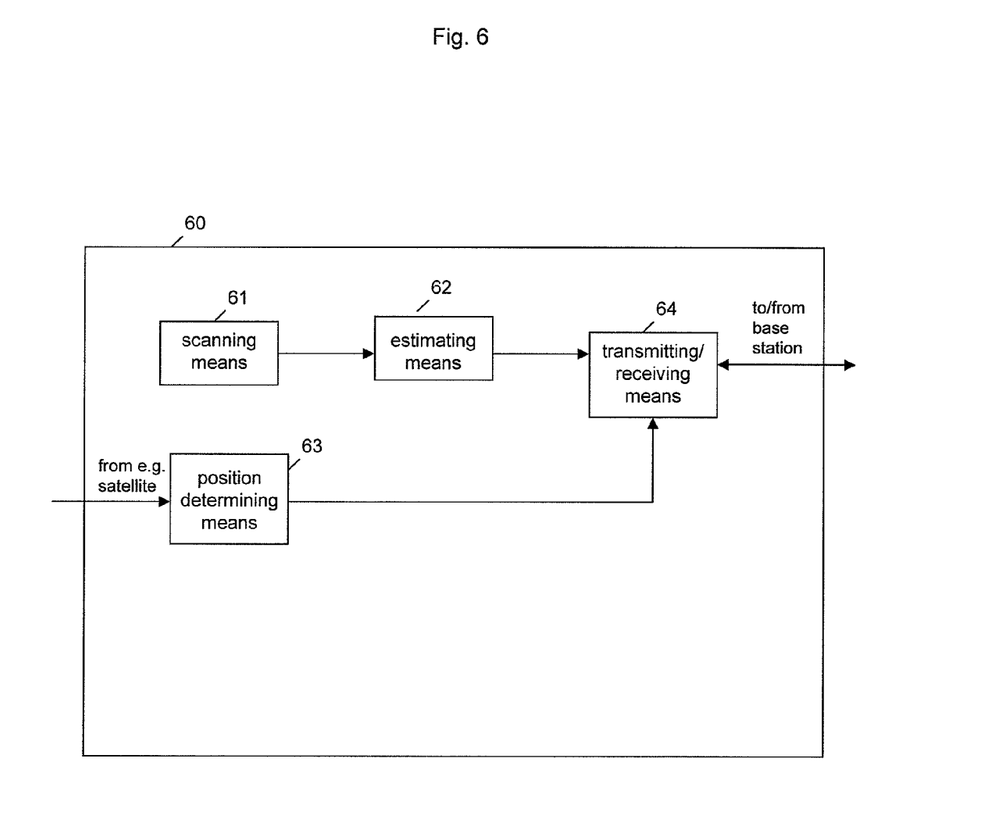
FIG. 6 is block diagram of a network element according to embodiments of the present invention.

FIG. 6 is block diagram of user equipment (network device) according to an embodiment of the present invention.

According to FIG. 6, the user equipment 60 comprises a scanning means 61 for scanning a specific frequency range of the candidate band of the primary system. The scanning means 61 is connected to an estimating means 62 for estimating the interference in the scanned frequency range based on the information provided by the scanning means 61. The user equipment further comprises a position determining means 63 for determining the own position. Such a positioning determining means may be based on the Global Positioning System (GPS), Galileo, or the like. However, also any other suitable means for determining the position of user equipment is applicable. The data from the estimating means 62 and the position determining means 63 are provided to a sending/receiving means 64 which sends the respective data to the base station of the secondary system. The sending/receiving means 64 is also adapted to receive instructions from the base station. All processing of the user equipment 60 is controlled by a processing device (not shown) like a CPU or the like.

Figure 7:
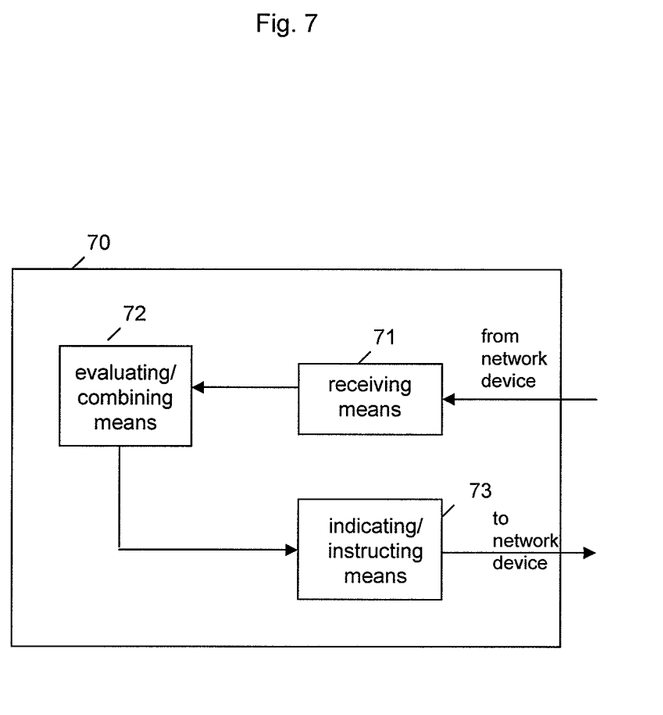
FIG. 7 is block diagram of a radio station according to embodiments of the present invention.

FIG. 7 is block diagram of a radio station according to embodiments of the present invention. The radio station may be e.g. a base station, a node B or the like.

According to FIG. 7, the radio station 70 comprises a receiving means 71 for receiving an estimation of the interference level on the scanned frequency range on the candidate band from at least one network device as well as for receiving position information of the network device. Alternatively, the position information can also be obtained through any other way than directly from the network device. For example, in case the network device is a stationary device, the position information may be stored in the radio station in advance. The radio station further comprises an evaluating/combining means 72 for evaluating an interference level in the entire cell area based on the received estimation of the interference level of the scanned frequency range on the candidate band and the position information of the network device. The evaluating/combining means 72 is further adapted to combine estimation results of a plurality of network devices. Additionally, the radio station 70 comprises an indicating/instruction means 73 for indicating the network device a suitable frequency range that is to be used for a resource request in dependence on the position of the network device and that spectrum resources of the particular frequency range of the primary system can be used at the particular position when the interference level at the particular position and frequency range is lower than a predetermined value. The indicating/instructing means 73 is further adapted to instruct network devices to to scan complementary frequency bands if it is recognized that two or more network devices have similar positions. As an alternative, if it is recognized that two or more network devices have similar positions, the indicating/instruction means 73 could instruct one of the network devices to stop scanning in order to save battery power.

In the foregoing description of the network element/radio station, only the means that are relevant for understanding the principles of the invention have been described using functional blocks. Of course it is obvious that the network device/radio station may comprise further means that are necessary for their operation. However, a description of these means is omitted in this specification. The arrangement of the functional blocks of the network device/radio station is not construed to limit the invention, and the functions may be performed by one block or further split into sub-blocks.

All processing steps that have been described in the foregoing can also be implemented using computer-readable signals that may be stored on a computer-readable medium and carry instructions to be executed by one of the entities/devices involved.

In view of the foregoing description it will be evident to a person skilled in the art that various modifications may be made within the scope of the invention.

The invention provides methods, a network device and radio station for spectrum resource allocation in a network employing spectrum sharing among at least a primary and secondary system, comprising scanning, by a network device of the secondary system, a specific frequency range of a candidate band of the primary system, estimating, by the network device, interference level on the scanned candidate band of the primary system, determining position of the network device, and transmitting the estimation result to a radio station of the secondary system.

The invention claimed is:

1. A method comprising:
   determining position information for two or more user devices;
   determining if the two or more user devices are in sufficiently similar positions that they are able to detect interference at the same frequency bands;
   if the two or more user devices are in sufficiently similar positions, performing at least one of directing the two or more user devices to scan complementary frequency bands with one another or directing one of the two or more user devices to stop scanning;
   receiving an estimation of interference level detected by the user device on a scanned frequency range of a candidate band of a primary system; and
   evaluating, based on the at least one estimation of the interference level and the position of at least one of the user devices, interference level in an entire cell area.

2. The method of claim 1, further comprising, indicating to the user device a suitable frequency for resource request according to the position of the user device.

3. The method of claim 1, further comprising combining estimation results of a plurality of user devices.

4. The method of claim 1, further comprising, when the interference level at a particular position and frequency is lower than a predetermined value, indicating to the user device that spectrum resources of the particular frequency of the primary system can be used at the particular position.

5. The method of claim 1 implemented in a radio communication base station.

6. An apparatus comprising:
   at least one processor;
   memory storing a program of instructions;
   wherein the memory storing the program of instructions is configured to, with the at least one processor, cause the apparatus to perform at least:
   determining position information for two or more user devices;
   determining if the two or more user devices are in sufficiently similar positions that they are able to detect interference at the same frequency bands;
   if the two or more user devices are in sufficiently similar positions, performing at least one of directing the two or more user devices to scan complementary frequency bands with one another or directing one of the two or more user devices to stop scanning;
   receiving an estimation of interference level detected by the user device on a scanned frequency range of a candidate band of a primary system; and
   evaluating, based on the at least one estimation of the interference level and the position of at least one of the user devices, interference level in an entire cell area.

7. The apparatus according to claim 6, wherein the apparatus is further caused to indicate to the user device a suitable frequency for resource request according to the position of the user device.

8. The apparatus according to claim 6, wherein the apparatus is further caused to combine estimation results of a plurality of user devices.

9. The apparatus according to claim 6, wherein the apparatus is further caused, when the interference level at a particular position and frequency is lower than a predetermined value, to indicate to the user device that spectrum resources of the particular frequency of the primary system can be used at the particular position.

10. The apparatus according to claim 6, wherein the apparatus is a radio communication base station.

11. A computer readable medium storing a program of instructions, execution of which by a processor configures an apparatus to perform a method according to claim 1.

* * * * *